(12) United States Patent
Shimada et al.

(10) Patent No.: US 12,286,374 B2
(45) Date of Patent: Apr. 29, 2025

(54) TITANIUM-CONTAINING QUARTZ GLASS HAVING EXCELLENT UV ABSORPTION, AND METHOD FOR PRODUCING SAME

(71) Applicants: Shin-Etsu Quartz Products Co., Ltd., Tokyo (JP); Heraeus Quarzglas GmbH & Co. KG, Hanau (DE)

(72) Inventors: Atsushi Shimada, Koriyama (JP); Katsuhide Orikasa, Koriyama (JP); Makoto Tanaka, Koriyama (JP); Tomoichi Kumata, Koriyama (JP); Hiromi Tarukawa, Koriyama (JP)

(73) Assignees: Shin-Etsu Quartz Products Co., Ltd., Tokyo (JP); Heraeus Quarzglas GmbH & Co. KG, Hanau (DE)

( * ) Notice: Subject to any disclaimer, the term of this patent is extended or adjusted under 35 U.S.C. 154(b) by 877 days.

(21) Appl. No.: 17/601,624

(22) PCT Filed: Jan. 17, 2020

(86) PCT No.: PCT/JP2020/001510
§ 371 (c)(1),
(2) Date: Oct. 5, 2021

(87) PCT Pub. No.: WO2020/202709
PCT Pub. Date: Oct. 8, 2020

(65) Prior Publication Data
US 2022/0204387 A1 Jun. 30, 2022

(30) Foreign Application Priority Data
Apr. 5, 2019 (JP) .................. 2019-072993

(51) Int. Cl.
*C03C 3/06* (2006.01)
*C03B 32/00* (2006.01)
*C03C 4/08* (2006.01)

(52) U.S. Cl.
CPC ............. *C03C 3/06* (2013.01); *C03B 32/00* (2013.01); *C03C 4/085* (2013.01); *C03C 2201/42* (2013.01); *C03C 2203/54* (2013.01)

(58) Field of Classification Search
CPC ............................ C03C 3/06; C03C 2201/42
See application file for complete search history.

(56) References Cited

U.S. PATENT DOCUMENTS

| | | | |
|---|---|---|---|
| 7,410,922 B2 | 8/2008 | Iwahashi et al. | |
| 8,105,734 B2 | 1/2012 | Maida et al. | |
| 8,820,122 B2 | 9/2014 | Maida et al. | |
| 2005/0245382 A1 | 11/2005 | Iwahashi et al. | |
| 2007/0042893 A1* | 2/2007 | Koike | C03C 3/06 65/102 |
| 2008/0305940 A1 | 12/2008 | Maida et al. | |
| 2010/0003609 A1 | 1/2010 | Maida et al. | |
| 2012/0056106 A1 | 3/2012 | Neumann | |
| 2012/0058419 A1 | 3/2012 | Maida et al. | |
| 2013/0123092 A1 | 5/2013 | Miyasaka et al. | |
| 2015/0097304 A1* | 4/2015 | Koike | C03C 3/06 264/293 |
| 2016/0085145 A1 | 3/2016 | Ochs et al. | |
| 2016/0185645 A1 | 6/2016 | Ochs et al. | |

FOREIGN PATENT DOCUMENTS

| | | |
|---|---|---|
| CN | 110198918 | 9/2019 |
| JP | H035339 | 1/1991 |
| JP | H0769671 | 3/1995 |
| JP | 2005022954 | 1/2005 |
| JP | 2007-273153 | 10/2007 |
| JP | 2010013335 | 1/2010 |
| JP | 2010150096 | 7/2010 |
| JP | 2011184210 | 9/2011 |
| JP | 2012072053 | 4/2012 |

OTHER PUBLICATIONS

International Search Report and Written Opinion in PCT/JP2020/001510.
Su, Junhong et al., "Optical Fiber Material Technology," Zhejiang Science and Technology Press, p. 44, Apr. 2009.

* cited by examiner

*Primary Examiner* — Elizabeth A. Bolden
(74) *Attorney, Agent, or Firm* — Dicke, Billig & Czaja, PLLC (57) ABSTRACT

Provided is a titanium-containing quartz glass having excellent UV absorption. The quartz glass absorbs ultraviolet rays having a wavelength of 250 nm or less, ozone generation-related adverse effects on the human body, are prevented, a decrease in transmittance of the quartz glass in the range from near-ultraviolet to visible light due to being colored when irradiated with ultraviolet rays does not occur, absorption build-up or lamp burst-inducing deformation build-up, which is caused by a structural change in the quartz glass that occurs in the range of 200-300 nm when irradiated with ultraviolet rays, is suppressed, and a decrease in transmittance at intended wavelength ranges does not occur even when exposed to ultraviolet rays. The titanium-containing quartz glass having excellent UV absorption is colorless, wherein the average concentration of titanium is 10-500 ppm, the concentration of OH group is 10-350 ppm.

4 Claims, 3 Drawing Sheets

TITANIUM-CONTAINING QUARTZ GLASS HAVING EXCELLENT UV ABSORPTION, AND METHOD FOR PRODUCING SAME

CROSS REFERENCE TO RELATED APPLICATION

This Utility Patent Application claims priority under 35 U.S.C. § 371 to International Application Serial No. PCT/JP2020/001510, filed Jan. 17, 2020, which claims the benefit of Japanese Patent Application No. 2019-072993, filed Apr. 5, 2019; which are both incorporated herein by reference.

TECHNICAL FIELD

The present invention relates to titanium-containing quartz glass having excellent UV absorption and to a method for producing same, and in particular the present invention relates to UV-absorbent quartz glass for use in discharge tubes and high-brightness discharge lamp materials, which does not contain foreign matter inclusions or bubbles, etc., has high purity, does not undergo a reduction in transmittance in the region from near ultraviolet to visible light as a result of UV irradiation, and which also suppresses an increase in strain but has excellent UV absorption at shorter wavelengths; titanium-containing quartz glass which is advantageously used in UV-blocking window materials, etc.; and a method for producing same.

BACKGROUND ART

For industrial use of UV light at a level of around 250 nm to 300 nm, quartz glass is doped with titanium when a natural material such as crystal powder is subjected to electrical melting or oxyhydrogen melting, and such quartz glass is conventionally used in various types of discharge tube materials and window materials for the purpose of preventing ozone, which is harmful to humans, formed from oxygen in the air by UV radiation at 220 nm or less which is emitted simultaneously from various types of discharge tube light sources in the industrial field of illumination, or is used for the purpose of absorbing UV radiation at wavelengths shorter than 254 nm or 365 nm, etc. in light sources for selectively using light of such wavelengths in the field of liquid-crystal production or semiconductor production.

However, there are problems with these molten quartz glasses in that they contain a large amount of air bubbles and foreign matter inclusions caused by the materials or doping method, a rate of defects increases because of removal of the air bubbles or foreign matter inclusions during the processing into a lamp shape or sheet shape, and it is no longer possible to obtain sheet materials of the required size. As the output of lamps has increased and the size thereof has increased in recent years, a need for large quartz glass tubes having an outer diameter of 50 mm or more and a wall thickness of 5 mm has arisen, and therefore the presence of causes of defects in external appearance due to air bubbles and foreign matter inclusions is an even greater problem, and it is difficult to produce thick-walled quartz glass tubes having a large opening diameter.

Furthermore, quartz glass which is conventionally used has not only absorption of transmittance due to titanium, but because the starting materials are natural materials, there is also absorption due to the effect of impurity metals such as iron and copper contained in a high concentration, and absorption due to oxygen defects known as the B2-band which are structural defects caused by the effect of the production method, and there is a reduction in transmittance of several percent in the wavelength range of approximately 230-260 nm compared with synthetic quartz glass, and a deterioration in light transmittance close to 250 nm.

In addition, in the conventional UV-absorbent quartz glass, the focus is only on the capacity to absorb UV radiation having a wavelength of shorter than 250 nm, and there has been no description of quartz glass capable of maintaining the intensity of UV light in a practical region of 250 nm-300 nm, while also reducing UV light intensity on the shorter wavelength side, and no description of production technology which is industrially advantageous.

Patent Document 1 indicates that various types of absorption in the ultraviolet range during UV irradiation are suppressed by producing quartz glass using synthetic starting materials, but this is not an example of doping with titanium, and the illustration given is limited to a high OH group concentration (1300 ppm) and a high chlorine concentration (200 ppm).

Patent Document 2 describes physical properties of UV-absorbent quartz glass for a discharge lamp and a method of production, but that invention describes only physical properties of the quartz glass which are preferred for UV absorption at 400 nm or less. According to the examples therein, a UV absorption edge when synthetic quartz glass is used as a substrate is 360 nm, but these are in no way physical properties capable of withstanding the selective use of UV radiation at the level of around 250 nm to 300 nm, which is a region that has seen great advances in recent years and is an objective of the present invention. Furthermore, that publication does not take account of strain in the quartz glass, which is a technical problem addressed by the present invention.

Patent Document 2 also describes a method for producing UV-absorbent synthetic quartz glass, but that method requires a vaporizer for vaporizing silicon tetrachloride and a transition metal element compound which are liquids at normal temperature, gas piping for supplying vaporized gases thereof, and large-scale heating and insulation equipment for preventing liquefication in the piping. It is necessary to make the equipment even larger in that method in order to produce a quartz glass parent material of a large size with a length in excess of 2 m at a better production cost, requiring considerable investment in equipment.

Patent Document 3 describes preferred physical properties and a production method for UV-absorbent synthetic quartz glass having excellent devitrification resistance. However, the examples of that document are lacking a description of the type and characteristics, etc. of the lamp which is used for evaluation, and it is not possible to ascertain the conditions under which the results of the examples and comparative examples are obtained. The UV-absorbent synthetic quartz glass described in the examples of that document comprises chlorine and is free from OH groups, and therefore if it were used for applications using UV radiation at the level of around 250 nm to 300 nm, which is an objective of the present invention, there would be a reduction in transmittance in the usage wavelength region due to oxygen defects which are normally substantial, and strain would also be produced.

PRIOR ART DOCUMENTS

Patent Documents

Patent Document 1: JP H3-5339 A
Patent Document 2: JP H7-69671 A

Patent Document 3: JP 2011-184210 A
Patent Document 4: JP 2007-273153 A

SUMMARY OF THE INVENTION

Problems to be Solved by the Invention

A first objective of the present invention lies in providing titanium-containing quartz glass having excellent UV absorption, which has the following characteristics a)-e).

a) It is possible to envisage preventing adverse effects, etc. on the human body, etc. due to the formation of ozone, by absorbing UV radiation at 250 nm or less, and when the quartz glass is used as a light source used in liquid-crystal production and semiconductor production, etc., it is possible to selectively use light having a wavelength of 254 nm or 365 nm by absorbing emission lines on the shorter wavelength side.

b) By virtue of the fact that the oxidation state of titanium contained in the quartz glass is tetravalent rather than trivalent, a phenomenon in which the quartz glass is colored black or violet, etc. and the transmittance decreases in the region from near ultraviolet to visible light does not occur.

c) The OH group concentration is between 10 ppm and 350 ppm, and the quartz glass is free from chlorine, so when the quartz glass is irradiated with UV radiation, it is possible to suppress an increase in absorption occurring in the range of 200 nm-300 nm due to structural defects in the quartz glass, and to suppress an increase in strain associated with breakage of a lamp.

d) The purity is high, so there is no effect from impurity metals to start with, and no absorption due to oxygen defects in a wavelength range of approximately 230-260 nm, and furthermore, even if the quartz glass is bathed in UV radiation, a reduction in transmittance of the intended usage wavelength (254 nm, 365 nm, etc.) does not arise.

e) There are very few defects in external appearance such as air bubbles and foreign matter inclusions, and the quartz glass can be advantageously used as a large product.

A second objective of the present invention lies in providing a method for producing the abovementioned titanium-containing quartz glass, wherein the whole of a glass parent material can be uniformly doped with titanium and the starting materials are of synthetic origin, so there are very few defects in external appearance such as air bubbles and foreign matter inclusions, and the method is advantageous for the production of large products.

Means for Solving the Problems

In order to solve the abovementioned problems, the present invention provides titanium-containing quartz glass having excellent UV absorption, in which an average concentration of titanium is between 10 ppm by mass and 500 ppm by mass, an OH group concentration is in a range of between 10 ppm by mass and 350 ppm by mass, the concentration of each of the elements Al, Li, Na, K, Ca, Mg, Fe, Ni, Cu, Cr, Mo and V is 50 ppb or less by mass, and the total thereof is 150 ppb or less by mass, a chlorine concentration is less than 30 ppm by mass, and the titanium-containing quartz glass is colorless. In the specification of this application, "ppm by mass" will be denoted as "ppm", and "ppb by mass" will be denoted as "ppb".

Preferably, the titanium-containing quartz glass contains two or fewer air bubbles and/or foreign matter inclusions having a diameter of equal to or greater than 0.1 mm and less than 0.5 mm per 100 g, no more than one air bubble and/or foreign matter inclusion having a diameter of between 0.5 mm and 1 mm per 100 g, and no air bubbles and/or foreign matter inclusions having a diameter in excess of 1 mm.

A method for producing the abovementioned titanium-containing quartz glass according to the present invention comprises: a titanium doping step in which a porous quartz glass parent material produced by chemical vapor deposition is introduced into a hermetically sealed vessel and held at a temperature of between 100° C. and 500° C. under a reduced-pressure atmosphere of 0.1 MPa or less, after which a titanium compound is introduced therein as a liquid or in a state of having already been gasified in a vaporizer, and the materials are held to perform doping in such a way that an average concentration of titanium in the resulting titanium-containing quartz glass is between 10 ppm by mass and 500 ppm by mass; and a step in which the porous quartz glass parent material after the titanium doping step is subjected to a heating treatment under an oxygen-containing atmosphere, and then subjected to a transparent vitrification treatment to obtain a colorless titanium-containing quartz glass having an OH group concentration in a range of between 10 ppm by mass and 350 ppm by mass.

The titanium compound is preferably at least one selected from the group consisting of titanium chloride and an organic titanium compound.

Advantage of the Invention

The present invention demonstrates considerable advantages in that it is possible to provide titanium-containing quartz glass having excellent UV absorption, which has the following characteristics a)-e).

a) It is possible to envisage preventing adverse effects, etc. on the human body, etc. due to the formation of ozone, by absorbing UV radiation at 250 nm or less, and when the quartz glass is used as a light source used in liquid-crystal production and semiconductor production, etc., it is possible to selectively use light having a wavelength of 254 nm or 365 nm by absorbing emission lines on the shorter wavelength side.

b) By virtue of the fact that the oxidation state of titanium contained in the quartz glass is tetravalent rather than trivalent, a phenomenon in which the quartz glass is colored black or violet, etc. and the transmittance decreases in the region from near ultraviolet to visible light does not occur.

c) The OH group concentration is between 10 ppm and 350 ppm, and the quartz glass is free from chlorine, so when the quartz glass is irradiated with UV radiation, it is possible to suppress an increase in absorption occurring in the range of 200 nm-300 nm due to structural defects in the quartz glass, and to suppress an increase in strain associated with breakage of a lamp.

d) The purity is high, so there is no effect from impurity metals to start with, and no absorption due to oxygen defects in a wavelength range of approximately 230-260 nm, and furthermore, even if the quartz glass is bathed in UV radiation, a reduction in transmittance of the intended usage wavelength (254 nm, 365 nm, etc.) does not arise.

e) There are very few defects in external appearance such as air bubbles and foreign matter inclusions, and the quartz glass can be advantageously used as a large product.

Furthermore, the present invention demonstrates a considerable advantage in that it is possible to provide a method for producing the abovementioned titanium-containing quartz glass, wherein the whole of a glass parent material can be uniformly doped with titanium and the starting materials are of synthetic origin, so there are very few defects in external appearance such as air bubbles and foreign matter inclusions, and the method is advantageous for the production of large products.

The titanium-containing quartz glass according to the present invention is advantageously employed in UV-absorbent quartz glass for use in discharge tubes and high-brightness discharge lamp materials, and UV-blocking window materials, etc. The present invention additionally makes it possible to inexpensively provide titanium-containing quartz glass having excellent UV absorption for use in large block materials and thick-walled glass tubes having a large opening diameter.

MODE FOR IMPLEMENTING THE INVENTION

A mode of embodiment of the present invention will be described below with reference to the appended drawings, but the examples depicted are for illustrative purposes and it goes without saying that various modifications may be made within a scope that does not depart from the technical concept of the present invention.

An average concentration of titanium in the titanium-containing quartz glass according to the present invention is 10 ppm or greater. If the average concentration of titanium is less than 10 ppm, light at 200 nm or less cannot be sufficiently blocked, and it is clear that when the quartz glass is used in a low-pressure mercury lamp in particular, it is not possible to block light at 185 nm, which is the next most intense after 254 nm in the emission lines, and ozone formation cannot be suppressed.

Furthermore, the average concentration of titanium in the titanium-containing quartz glass according to the present invention is 500 ppm or less.

Patent Document 4 describes a lamp employing quartz glass doped with titanium oxide, wherein the wavelength absorbed by the titanium shifts to the long wavelength side when the temperature of a lamp main body increases. The inventors of this application produced a spectrophotometer capable of taking measurements up to 1000° C., and when a measurement was made of a shift amount of the transmittance at 800° C. in a sample having a titanium concentration of 600 ppm with a thickness of 2 mm and a 50% transmittance wavelength at 25° C. of 251 nm, the 50% transmittance wavelength was approximately 300 nm. This corresponds to approximately 310 nm when the thickness of the glass is 5 mm. The thickness of the glass may also exceed 5 mm when used in a light source of a high-pressure mercury lamp which reaches a very high temperature and employs emission lines of 300 nm or greater, and since absorbance is proportional to the length over which light is transmitted, the absorption of the glass itself increases in proportion to the increased thickness, and there is a further shift to the long wavelength side, and it was therefore clear that quartz glass comprising 600 ppm of titanium cannot be used in such applications.

The inventors of this application further produced samples having a thickness of 2 mm in which the titanium concentration was varied as shown in table 1 below, and carried out the same measurements. As shown in table 1, in the samples having a titanium concentration of 500 ppm or less, the shift amount of transmittance at 800° C. decreases, and it is clear that such glass can also be advantageously used for a light source in a high-pressure mercury lamp which reaches a very high temperature and employs emission lines of 300 nm or greater.

TABLE 1

| Titanium concentration | 50% transmittance wavelength at 25° C. | 50% transmittance wavelength at 800° C. |
|---|---|---|
| 10 ppm | 222 nm | 236 nm |
| 100 ppm | 238 nm | 267 nm |
| 200 ppm | 244 nm | 278 nm |
| 300 ppm | 247 nm | 283 nm |
| 400 ppm | 249 nm | 287 nm |
| 500 ppm | 250 nm | 290 nm |
| 600 ppm | 251 nm | 302 nm |

In the titanium-containing quartz glass, the 50% transmittance wavelength at 25° C. when the thickness is 2 mm is preferably in a range of between 220 nm and 250 nm. By setting this range, the 50% transmittance wavelength at 800° C. is between 235 nm and 290 nm as shown in table 1, and even if the thickness is 5 mm, the 50% transmittance wavelength at 800° C. is kept to 300 nm or less, so it is possible to advantageously use the titanium-containing quartz glass for UV usage applications at the level of around 250 m to 300 nm, and in particular the titanium-containing quartz glass can be advantageously used as an article that does not form ozone.

The titanium-containing quartz glass according to the present invention preferably has a uniform distribution of the titanium concentration. Specifically, when the average concentration of titanium in the titanium-containing quartz glass is 100 ppm or less, a difference A between the minimum value and the maximum value of the titanium concentration in the glass is preferably 30 ppm or less, and when the average concentration of titanium exceeds 100 ppm, the difference A between the minimum value and the maximum value of the titanium concentration is preferably 50 ppm or less.

The ionic valence of the titanium contained in the titanium-containing quartz glass should be a tetravalent state. As will be described later, when a porous quartz glass parent material is doped with titanium and then heat-treated in a reducing atmosphere to form transparent glass, most of the titanium is trivalent, and the resulting quartz glass is colored black or violet, etc. so that there is a reduction in transmittance in the visible light region. The titanium-containing quartz glass according to the present invention comprises tetravalent titanium, and is colorless before UV irradiation. It should be noted that in the present invention, "colorless" means colorless to the naked eye, and strictly speaking means that the 300 nm transmittance at 25° C. of a sample having a thickness of 2 mm is 91% or greater.

The maximum value of the concentration of each of the elements Al, Li, Na, K, Ca, Mg, Fe, Ni, Cu, Cr, Mo and V in the titanium-containing quartz glass according to the present invention is 50 ppb or less, and the total thereof is 150 ppb or less. Patent Document 1 indicates that when the concentration of impurities contained in quartz glass is equal to or greater than a fixed value, coloring is produced by UV irradiation. The titanium-containing quartz glass according to the present invention has the purity mentioned above, and as a result it is possible to obtain quartz glass in which coloring does not occur as a result of formation of a color center during UV irradiation, and a reduction in transmittance in the visible light region does not occur. Synthetic quartz glass is preferred for achieving this purity.

Specifically, when the titanium-containing quartz glass is irradiated with UV radiation at an irradiation energy of 30 mW/cm$^2$ for 1000 hours, for example, there is preferably no coloring, and the titanium-containing quartz glass is colorless. Furthermore, when the titanium-containing quartz glass is irradiated with UV radiation at an irradiation energy of 30 mW/cm$^2$ for 1000 hours, there is preferably no reduction in transmittance due to the formation of a color center at a wavelength of 800 nm or less.

The range (minimum value to maximum value) of the OH group concentration in the titanium-containing quartz glass according to the present invention is adjusted to between 10 ppm and 350 ppm. The adjustment of the OH groups may be carried out before the porous quartz glass parent material is doped with a titanium compound which is a dopant, or at the time of transparent vitrification after the doping.

A surface portion of quartz glass on a lamp light-source side of a low-pressure mercury lamp is damaged by UV light irradiation at 250 nm or less, which breaks down Si—O bonds so that Si. forms and oxygen defects which are structural defects arise. When the quartz glass comprises OH groups, the OH groups in the glass are used to repair these defects, so absorption by oxygen defects occurring in the region of 200-300 nm is suppressed, but there is a limit to the repair of defects by the OH groups if the OH groups are less than 10 ppm, and therefore absorption due to oxygen defects cannot be adequately repaired, and when light of 254 nm is used, for example, output at the same wavelength decreases due to absorption by a bulb wall, and the glass may crack due to strain caused by the increase in oxygen defects. The OH group concentration of the titanium-containing glass is therefore 10 ppm or greater.

Oxygen defects still occur if the OH groups exceed 350 ppm, but the defects are sufficiently repaired by the OH groups present, and absorption by oxygen defects occurring in transmittance close to 200 nm-300 nm is suppressed. However, if the OH groups exceed 350 ppm, stress-strain is produced close to the glass surface and increases, as a result of which the transmitted light is subjected to the effect of the strain and it is not possible to obtain the required quantity of light, and furthermore, it was understood from the present research that there is a risk of the glass cracking. The principle of this action cannot be identified, but a possible cause lies in the fact that densification of the glass at specific locations progresses as a result of repeated defect repairs at the uppermost surface of the quartz glass.

Furthermore, the temperature may sometimes exceed 600° C. when quartz glass is used in a lamp, and if the quartz glass comprises a large amount of OH groups there is a risk of a reduction in viscosity and deformation of the lamp, and as a result of the present investigations, it was found that the OH group concentration needs to be 350 ppm or less.

The OH group concentration in the titanium-containing quartz glass is therefore 350 ppm or less, preferably 100 ppm or less, and more preferably 50 ppm or less. The viscosity also increases further and the risk of deformation of the lamp also decreases if the OH group concentration is 100 ppm or less.

The maximum value of the chlorine concentration in the titanium-containing quartz glass according to the present invention is less than 30 ppm. When quartz glass having a chlorine concentration of 30 ppm or greater is subjected to UV irradiation, Si—Cl bonds break down so that Si. forms and absorption is apparent in transmittance close to 200 nm-300 nm as a structural defect, which has an effect when light of 254 nm is used, for example, and not only does the transmittance decrease, this also leads to stress-strain due to the structural defects, with a possibility of cracking, so chlorine must be excluded beforehand.

The titanium-containing quartz glass according to the present invention has excellent UV absorption and preferably has transmittance of a wavelength of 185 nm at 25° C. of 1% or less when the thickness is 2 mm.

The titanium-containing quartz glass according to the present invention is free from air bubbles and foreign matter inclusions, etc., which are a problem during processing of bulb materials for high-brightness discharge lamps or UV-blocking glass sheet materials, etc., and also contains high-purity titanium. Specifically, the glass preferably contains two or fewer air bubbles and/or foreign matter inclusions having a diameter of equal to or greater than 0.1 mm and less than 0.5 mm per 100 g, no more than one air bubble and/or foreign matter inclusion having a diameter of between 0.5 mm and 1 mm per 100 g, and no air bubbles and/or foreign matter inclusions having a diameter in excess of 1 mm. 100 g of quartz glass corresponds to a glass tube having an outer diameter of 50 mm, a wall thickness of 5 mm, and a length of approximately 65 mm. Natural quartz glass often contains four or more air bubbles or foreign matter inclusions per 100 g, which is a problem. The present invention makes it possible to obtain titanium-containing quartz glass which is free from air bubbles and foreign matter inclusions having a diameter in excess of 1 mm, and also has three or fewer air bubbles or foreign matter inclusions having a diameter of 1 mm or less which can be visually confirmed, per 100 g. It should be noted that a diameter of 0.1 mm is the lower limit value of air bubbles which can be visually confirmed.

The method for producing the titanium-containing quartz glass according to the present invention preferably comprises: a step in which a high-purity porous quartz glass parent material is prepared; a titanium doping step in which the porous quartz glass parent material is doped with a titanium dopant; and a step in which the porous quartz glass parent material after the titanium doping step is subjected to a heating treatment under an oxygen-containing atmosphere, and then subjected to transparent vitrification.

The high-purity porous quartz glass parent material is preferably prepared in such a way as to obtain, as the starting parent material, which is doped with titanium, quartz glass in which the maximum value of the concentration of each of the elements Al, Li, Na, K, Ca, Mg, Fe, Ni, Cu, Cr, Mo and V is 50 ppb or less, and the total thereof is 150 ppb or less. A porous quartz glass parent material produced by chemical vapor deposition (CVD) is preferably used as the high-purity porous quartz glass parent material. OVD (outside vapor deposition) is preferred for quartz glass where the intended final shape is tubular, and VAD (vapor axial deposition) is preferred for block-shaped quartz glass. The porous quartz glass parent material makes it possible to obtain quartz glass in which the concentration of each of the elements Al, Li, Na, K, Ca, Mg, Fe, Ni, Cu, Cr, Mo and V is 50 ppb or less, and the total thereof is 150 ppb or less, by using a high-purity silicon compound, e.g., silicon tetrachloride ($SiCl_4$) or octamethylcyclotetrasiloxane ($C_8H_{24}O_4Si_4$).

In the titanium doping step, the porous quartz glass parent material is doped with the dopant in such a way that quartz glass having an average titanium concentration of between 10 ppm and 500 ppm is obtained, and a method in which the interior of a vessel containing the porous quartz glass material is temporarily placed under a vacuum at a temperature of between 100° C. and 500° C., the porous quartz glass material is held under a reduced-pressure atmosphere of 0.1 MPa or less, then the dopant is introduced and the materials are heated and held inside the hermetically sealed vessel, is especially preferable to a method in which a heating treatment is performed under a stream of gas into the vessel, because the amount of doping can be determined, and there is also little loss of the dopant and the whole parent material can be uniformly doped. The dopant which is introduced may be a vaporized dopant in a state in which a titanium compound has been gasified in a vaporizer in advance, or it may be introduced inside the hermetically sealed vessel as a liquid and vaporized inside the vessel.

The titanium compound which is used as the titanium dopant may be a well-known titanium dopant, and a chlorine compound of titanium or an organic titanium compound is preferred.

Titanium tetrachloride is preferred as the chlorine compound of titanium.

Tetraisopropyl orthotitanate ($C_{12}H_{28}O_4Ti$), dichlorodiethoxy titanium ($C_4H_{10}Cl_2O_2Ti$), chlorotitanium triisopropoxide ($C_9H_{21}ClO_3Ti$), or tetrakis(trimethylsiloxy)titanium ($C_{12}H_{36}O_4Si_4Ti$), etc. may be used as the organic titanium compound. Tetraisopropyl orthotitanate ($C_{12}H_{28}O_4Ti$), etc., which has a low boiling point, is especially preferred because of ease of handling of the dopant.

The heating treatment in the titanium doping step is preferably carried out at between 100° C. and 500° C. When a chlorine compound of titanium is used as the dopant, heat treatment is performed at 100° C. or greater, whereby the chlorine compound of titanium is vaporized and made to permeate into the porous quartz glass parent material. Meanwhile, if the temperature exceeds 500° C., there is an increase in reactivity between Si—OH and chlorine, in addition to the oxidation reaction of the chlorine compound of titanium, leading to an increase in Si—Cl bonds. It is difficult to reduce Si—Cl by means of the subsequent heat treatment in an oxygen-containing atmosphere, so it is necessary for the temperature in the doping step employing a chlorine compound of titanium to be set at 500° C. or less in order to ensure that the chlorine concentration in the quartz glass is less than 30 ppm. When an organic compound of titanium is used as the dopant, the temperature is such that degradation does not occur before the dopant penetrates the parent material while a reaction with the OH groups is minimized, and an oxygen-free atmosphere is needed so as to ensure that there is no reaction with oxygen; the temperature is preferably 500° C. or less.

The porous quartz glass parent material after the titanium doping step is subjected to a heating treatment at between 100° C. and 1300° C. under an oxygen-containing atmosphere, whereby an oxidation treatment is performed using oxygen and the OH groups contained in the parent material, a dechlorination and dehydrochlorination treatment is performed, and a treatment to control the ionic valence of the titanium to tetravalent is performed. Oxygen-containing atmospheres which may be cited include oxygen alone, or a mixed atmosphere comprising oxygen with at least one type of gas from among nitrogen, argon and helium.

The titanium-doped porous quartz glass parent material is subjected to the heating treatment at 100° C. or greater under an oxygen-containing atmosphere, whereby oxidation of the titanium starts, the ionic valence of the titanium is controlled to tetravalent, and colorless quartz glass is obtained.

If transparent vitrification is carried out without performing the treatment in an atmosphere containing oxygen, or if transparent vitrification is carried out by performing the heat treatment in a reducing atmosphere, most of the titanium becomes trivalent, and the resulting quartz glass is colored black or violet, etc. leading to a reduction in transmittance in the visible light region.

For example, when titanium tetrachloride, serving as a chlorine compound of titanium, is used as the dopant, the oxidation reaction in the porous quartz glass parent material is shown by formulae (1) and (2) below, and chlorine and hydrochloric acid are formed.

$$TiCl_4 + O_2 \rightarrow TiO_2 + 2Cl_2 \qquad (1)$$

$$TiCl_4 + 2H_2O \rightarrow TiO_2 + 4HCl \qquad (2)$$

The majority of the chlorine present in the porous quartz glass parent material is believed to be present in the state of $Cl_2$ and HCl, and it is clear that when the temperature is 500° C. or less for the doping, the reaction to Si—Cl can be suppressed while it is also possible to expel chlorine atoms to outside the parent material as chlorine and hydrochloric acid, by means of the subsequent heat treatment at 100° C. or greater under an oxygen-containing atmosphere.

However, if the heat treatment temperature under an oxygen-containing atmosphere exceeds 1300° C., vitrification of the surface of the porous quartz glass parent material starts, so the OH groups, $Cl_2$ and HCl are not readily removed to outside the parent material.

The heating treatment of the titanium-doped porous quartz glass parent material is therefore carried out at between 100° C. and 1300° C. under an oxygen-containing atmosphere.

The conditions during the step of transparent vitrification after the heating treatment under an oxygen-containing atmosphere are preferably such that the heating treatment is performed under a reduced-pressure atmosphere of 0.1 MPa or less and transparent vitrification is performed, in order to set the OH group concentration at 350 ppm or less.

Furthermore, the production method preferably includes a step in which the OH group concentration in the titanium-containing quartz glass is adjusted to a range of between 10 ppm and 350 ppm. The adjustment of the OH groups may be performed in the porous quartz glass parent material before the titanium doping step, or may be performed during transparent vitrification after the titanium doping step. The OH groups are preferably adjusted commensurately with the amount of doping before the titanium doping step, because when a chlorine compound of titanium is used as the dopant, the vaporized chlorine compound of titanium permeates into the parent material while reacting with the OH groups inside the parent material.

EXEMPLARY EMBODIMENTS

The present invention will be described in more specific terms through the following exemplary embodiments, but it goes without saying that these exemplary embodiments are given for illustrative purposes and should not be interpreted in a limiting manner.

Values of physical properties in the specification of this application were measured as follows.

- Measurement of Ti concentration: measured by means of ICP-MS (detection limit: 1 ppb).
- Measurement of OH group concentration: measured by means of infrared absorption spectrophotometry (detection limit: 0.1 ppm).
- Measurement of impurity concentration: measured by means of ICP-MS (detection limit: 1 ppb).
- Measurement of chlorine concentration: measured by means of X-ray fluorescence (detection limit: 30 ppm).
- Measurement of apparent transmittance: transmittance of light in a range of 150 nm-900 nm was measured at 25° C. by a spectrophotometer in relation to a sample having a thickness of 2 mm with both surfaces mirror-surface finished.
- Measurement of high-temperature transmittance: a spectrophotometer capable of withstanding a high-temperature state of around 1000° C. was produced by the inventors and transmittance of light in a range of 150 nm-900 nm was measured at 800° C. by using this spectrophotometer in relation to a sample having a thickness of 2 mm with both surfaces mirror-surface finished.
- Measurement after UV irradiation: a sample having a thickness of 2 mm with both surfaces mirror-surface finished was irradiated for 1000 hours with light from a low-pressure mercury lamp (185 nm, 254 nm) having an irradiation energy of 30 mW/cm$^2$, after which transmittance of light in a range of 150 nm-900 nm was measured at 25° C. by a spectrophotometer, the absence or presence of coloring (color center) was confirmed visually and by 300 nm transmittance, and strain was confirmed by the sensitive color method (detection limit: 5 nm/cm$^2$).
- Air bubbles and foreign matter inclusions were visually confirmed.

Exemplary Embodiment 1

The following steps a-e were carried out under the conditions shown in table 2 to obtain titanium-containing quartz glass.

<Step a> Porous Quartz Glass Parent Material Preparation Step

Approximately 100 kg of a porous quartz glass parent material were produced by chemical vapor deposition (CVD) using high-purity silicon tetrachloride, which is a synthetic quartz glass starting material, as the starting material.

<Step b> OH Group Concentration Adjustment Step

The porous quartz glass parent material obtained in the step a was subjected to a heating treatment for 20 hours under a nitrogen gas atmosphere at 100° C. to adjust the OH groups contained in the porous quartz glass parent material.

<Step c> Titanium Doping Step

The porous quartz glass parent material obtained after the step b was introduced into a hermetically sealed vessel, and the atmosphere was substituted with nitrogen gas, after which the temperature inside the oven was held at 300° C. and heating was performed for 10 hours for the purpose of soaking the parent material through to the interior thereof. The pressure was then reduced to <0.1 MPa using a vacuum pump, and the material was held and sealed off, after which titanium tetrachloride (TiCl$_4$) was introduced into the oven in a liquid state in an amount of 1% of the weight of the approximately 100 kg of porous quartz glass parent material, and vaporized inside the oven, then held for 10 hours at 300° C.

<Step d> Heating Treatment Step Under an Oxygen-Containing Atmosphere

The porous quartz glass parent material obtained via the step c was subjected to a heating treatment for 10 hours under an oxygen atmosphere at 400° C., and an oxidation treatment was performed using oxygen and the OH groups contained in the parent material, a dechlorination and dehydrochlorination treatment was performed, and a treatment to control the ionic valence of the titanium to tetravalent was performed.

<Step e> Transparent Vitrification Treatment Step

The porous quartz glass parent material obtained via the step d was held for 5 hours at 1600° C. under a reduced-pressure atmosphere of <0.1 MPa, and a transparent vitrification treatment was performed to obtain a quartz glass body having an outer diameter of 200 mm and a length of 2000 mm.

TABLE 2

| | Step a | Step b | | | Step c | | Amount of dopant (weight ratio parent material) |
|---|---|---|---|---|---|---|---|
| | Parent-material | Temp. (° C.) | Atm. | Time (h) | Temp. (° C.) | Atm. | |
| Exemplary Embodim. 1 | CVD | 100 | N$_2$ 100% | 20 | 300 | only TiCl$_4$ | 1% |
| Exemplary Embodim. 2 | CVD | 100 | N$_2$ 100% | 20 | 500 | TiCl$_4$ + N$_2$ | 2% |
| Exemplary Embodim. 3 | CVD | 1300 | <0.1 MPa | 100 | 500 | TiCl$_4$ + N$_2$ | 2% |
| Exemplary Embodim. 4 | CVD | 1000 | N$_2$ 100% | 20 | 200 | TiCl$_4$ + N$_2$ | 0.2% |
| Exemplary Embodim. 5 | CVD | 1300 | <0.1 MPa | 100 | 150 | TiCl$_4$ + N$_2$ | 0.1% |

TABLE 2-continued

| | | | | | | | | |
|---|---|---|---|---|---|---|---|---|
| Exemplary Embodim. 6 | CVD | 100 | $N_2$ 100% | 20 | 200 | $TiCl_4 + N_2$ | 0.1% |
| Exemplary Embodim. 7 | CVD | 100 | $N_2$ 100% | 20 | 300 | only $Cl_2H_{28}O_4Ti$ | 1.6% |

| | Step c | Step d | | | Step e | | |
|---|---|---|---|---|---|---|---|
| | Time (h) | Temp. (° C.) | Atm. | Time (h) | Temp. (° C.) | Atm. | Time (h) |
| Exemplary Embodim. 1 | 10 | 400 | $O_2$ 100% | 10 | 1600 | <0.1 MPa | 5 |
| Exemplary Embodim. 2 | 10 | 1300 | $O_2$ 100% | 10 | 1600 | <0.1 MPa | 5 |
| Exemplary Embodim. 3 | 10 | 1300 | $O_2$ 20% + $N_2$ 80% | 20 | 1500 | <1 Pa | 50 |
| Exemplary Embodim. 4 | 10 | 400 | $O_2$ 20% + $N_2$ 80% | 20 | 1500 | <1 Pa | 30 |
| Exemplary Embodim. 5 | 10 | 150 | $O_2$ 100% | 10 | 1500 | <1 Pa | 50 |
| Exemplary Embodim. 6 | 10 | 150 | $O_2$ 100% | 10 | 1600 | <0.1 MPa | 5 |
| Exemplary Embodim. 7 | 10 | 400 | $O_2$ 100% | 10 | 1600 | <0.1 MPa | 5 |

Values of the physical properties of the resulting quartz glass body were measured. The values of the physical properties were measured by cutting round slices from a central portion and both end portions in a longitudinal direction of the quartz glass body, and further dividing the round slices into 10 equal parts in a radial direction. Air bubbles and foreign matter inclusions were confirmed by checking the glass as a whole before the samples were cut.

Figure 1:
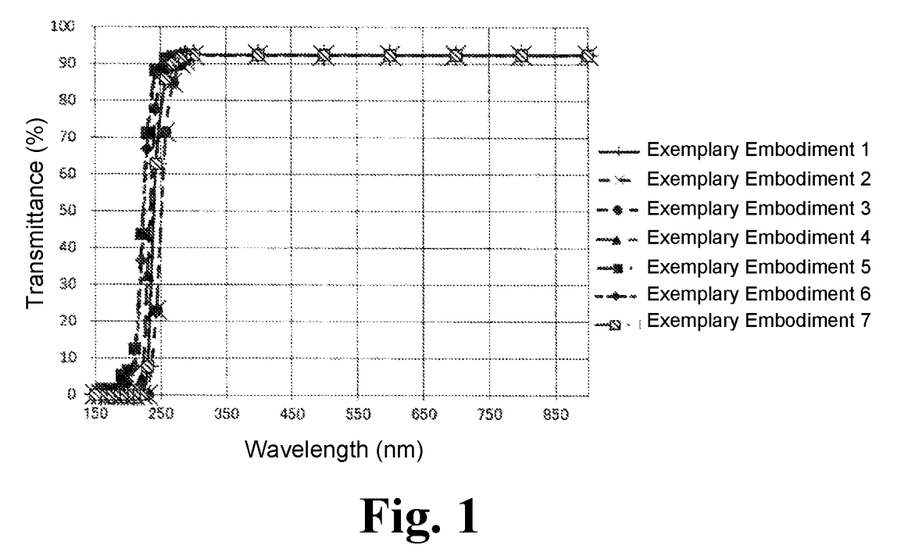
FIG. 1 is a graph showing measurement results of transmittance of wavelengths of 150-900 nm before UV irradiation in Exemplary Embodiments 1-7.
Figure 2:
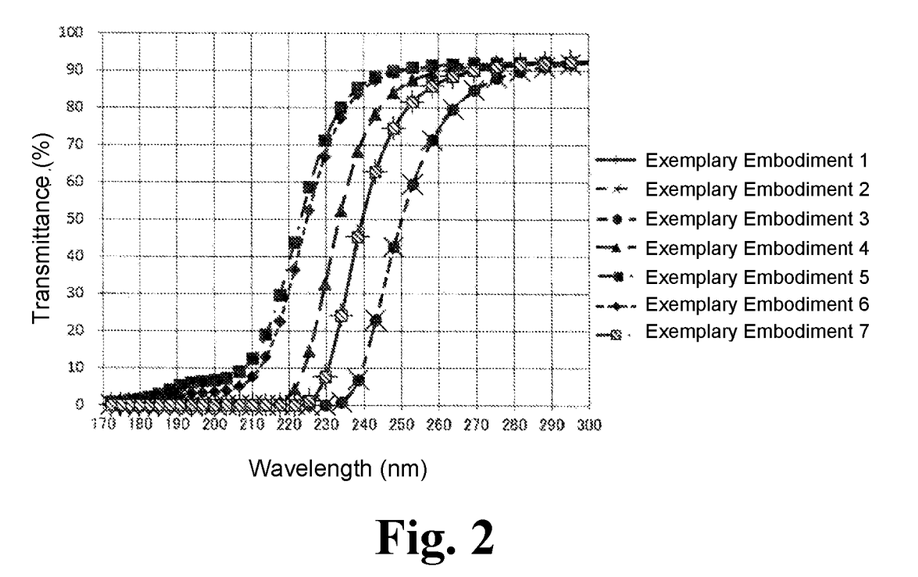
FIG. 2 is a graph showing measurement results of transmittance of wavelengths of 170-300 nm before UV irradiation in Exemplary Embodiments 1-7.
Figure 3:
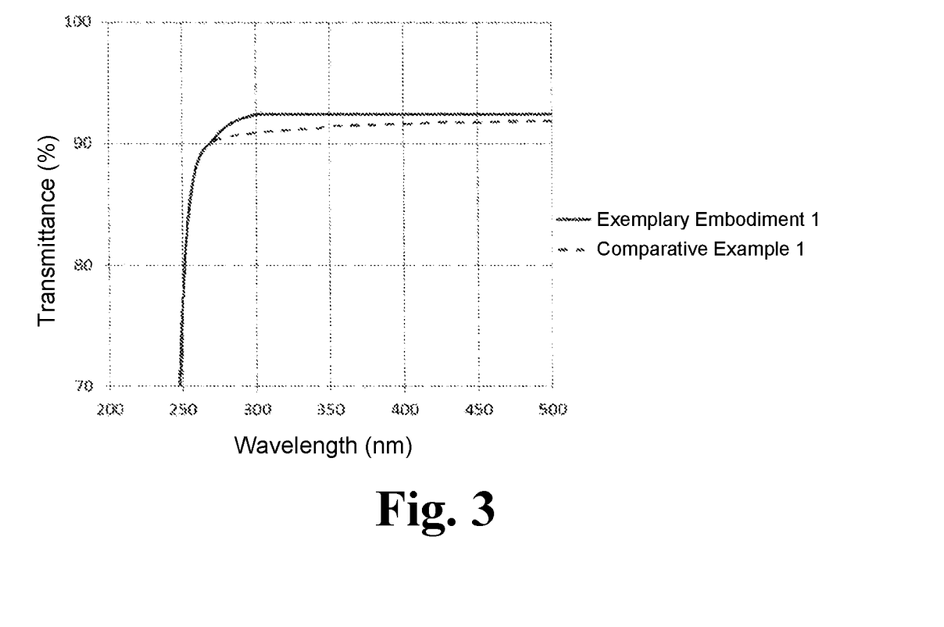
FIG. 3 is a graph showing measurement results of transmittance before UV irradiation in Exemplary Embodiment 1 and Comparative Example 1.

The results are shown in tables 3 and 4, and FIG. 1-3. In the tables, the values of the titanium concentration denote the minimum value-maximum value and average value of the measured values, the values of the OH group concentration denote the maximum value and minimum value of the measured values, and the values of the chlorine concentration denote the maximum value of the measured values. In the table relating to purity, the values of concentrations of each of the elements Al, Li, Na, K, Ca, Mg, Fe, Ni, Cu, Cr, Mo and V denote maximum values at each measurement point, and the total denotes the total of the maximum values of the concentrations of each of the elements. FIG. 1-3 are graphs showing measurement results of transmittance before UV irradiation, and the results obtained after UV irradiation for 1000 hours were the same as those obtained before UV irradiation.

Detection limit for each element: 1 ppb
Detection limit of chlorine concentration: 30 ppm
Detection limit of strain: 5 nm/cm$^2$

TABLE 3

| | Titanium concentration (ppm) | | OH group concentration (ppm) | | Chlorine concentration | Number of bubbles/ foreign matter inclusions (per 100 g) | | | Before UV radiation |
|---|---|---|---|---|---|---|---|---|---|
| | Average | Measures | Max. value | Min. value | | 0.1~0.5 mm | 0.5~1 mm | >1 mm | Color |
| Exemplary Embod. 1 | 120 | 110-140 | 350 | 200 | Not detected | 2 | 1 | 0 | Colorless |
| Exemplary Embod. 2 | 500 | 480-525 | 340 | 200 | Not detected | 0 | 0 | 0 | Colorless |
| Exemplary Embod. 3 | 490 | 465-510 | 30 | 15 | Not detected | 0 | 0 | 0 | Colorless |
| Exemplary Embod. 4 | 50 | 40-65 | 60 | 20 | Not detected | 0 | 0 | 0 | Colorless |
| Exemplary Embod. 5 | 12 | 10-15 | 25 | 13 | Not detected | 0 | 0 | 0 | Colorless |
| Exemplary Embod. 6 | 15 | 12-19 | 340 | 190 | Not detected | 2 | 1 | 0 | Colorless |
| Exemplary Embod. 7 | 120 | 100-145 | 340 | 180 | Not detected | 0 | 0 | 0 | Colorless |

TABLE 3-continued

| | | Before UV radiation | | | | After 1000 h UV radiation | |
|---|---|---|---|---|---|---|---|
| | | 300 nm transmission (%) | 185 nm transmission (%) | 50% transmission (nm) | | 300 nm transmission (%) | Strain (nm/cm) |
| | | | | 25° C. | 800° C. | Color | | |
| Exemplary Embodim. 1 | | 92.4 | <1 | 240 | 270 | Colorless | 92.4 | Not detected |
| Exemplary Embodim. 2 | | 92.2 | <1 | 250 | 290 | Colorless | 92.2 | Not detected |
| Exemplary Embodim. 3 | | 92.2 | <1 | 250 | 290 | Colorless | 92.2 | Not detected |
| Exemplary Embodim. 4 | | 92.4 | <1 | 233 | 258 | Colorless | 92.4 | Not detected |
| Exemplary Embodim. 5 | | 92.4 | <1 | 223 | 239 | Colorless | 92.4 | Not detected |
| Exemplary Embodim. 6 | | 92.4 | <1 | 225 | 242 | Colorless | 92.4 | Not detected |
| Exemplary Embodim. 7 | | 92.4 | <1 | 240 | 270 | Colorless | 92.4 | Not detected |

TABLE 4

| Purity | Element concentration (ppb) | | | | | | | | | | | | Total (PPb) |
|---|---|---|---|---|---|---|---|---|---|---|---|---|---|
| | Al | Li | Na | K | Ca | Mg | Fe | Ni | Cu | Cr | Mo | V | |
| Exemplary Embodim. 1 | 6 | 1 | 1 | Not detected | Not detected | Not detected | Not detected | Not detected | 1 | 1 | Not detected | Not detected | 10 |
| Exemplary Embodim. 2 | 2 | 4 | 36 | 5 | 30 | Not detected | 20 | 5 | 1 | 20 | Not detected | Not detected | 123 |
| Exemplary Embodim. 3 | 5 | 1 | 20 | 3 | 35 | Not detected | 30 | 15 | 1 | 25 | Not detected | Not detected | 135 |
| Exemplary Embodim. 4 | 1 | 1 | 4 | 3 | 25 | Not detected | 22 | 1 | 1 | 15 | Not detected | Not detected | 73 |
| Exemplary Embodim. 5 | Not detected | 4 | 36 | 1 | Not detected | Not detected | Not detected | 1 | 1 | Not detected | Not detected | Not detected | 43 |
| Exemplary Embodim. 6 | Not detected | 1 | 1 | Not detected | 1 | Not detected | Not detected | Not detected | Not detected | Not detected | Not detected | Not detected | 3 |
| Exemplary Embodim. 7 | Not detected | 1 | 1 | Not detected | Not detected | Not detected | Not detected | Not detected | Not detected | Not detected | Not detected | Not detected | 2 |

As shown in table 3, the 300 nm transmittance was 92.4%, and the titanium was considered tetravalent. Furthermore, the 185 nm transmittance was <1%, and it was clearly possible to block light of 185 nm, which it is desirable to block in a low-pressure mercury lamp, and also possible to suppress ozone formation.

Light from the low-pressure mercury lamp having an irradiation energy of 30 mW/cm$^2$ was irradiated for 1000 hours, but no absorption due to coloring could be seen in the visible region. Furthermore, when strain was confirmed by the sensitive color method, no strain was observed.

Furthermore, the glass contained two air bubbles and/or foreign matter inclusions having a diameter of equal to or greater than 0.1 mm and less than 0.5 mm per 100 g, one air bubble or foreign matter inclusion having a diameter of between 0.5 mm and 1 mm per 100 g, and 0 air bubbles and/or foreign matter inclusions having a diameter in excess of 1 mm.

Exemplary Embodiment 2

Titanium-containing quartz glass was obtained by means of the same method as in Exemplary Embodiment 1 except for the following steps, as shown in table 2.

<Step c>

The porous quartz glass parent material obtained after the step b was introduced into a hermetically sealed vessel, and the atmosphere was substituted with nitrogen gas, after which the temperature inside the oven was held at 500° C. and heating was performed for 10 hours for the purpose of soaking the parent material through to the interior thereof. The pressure was then reduced to 0.1 MPa or less using a vacuum pump, and the material was held and sealed off, after which titanium tetrachloride (TiCl$_4$) was introduced into the oven in a liquid state in an amount of 2% of the weight of the porous quartz glass parent material, and vaporized inside the oven, the pressure inside the vessel was stabilized then returned to atmospheric pressure using nitrogen gas, and the materials were held for 10 hours at 500° C.

<Step d>

The porous quartz glass parent material obtained via the step c was subjected to a heating treatment for 10 hours under an oxygen atmosphere at 1300° C., and an oxidation treatment was performed using oxygen and the OH groups contained in the parent material, a dechlorination and dehydrochlorination treatment was performed, and a treatment to control the ionic valence of the titanium to tetravalent was performed.

Values of the physical properties of the resulting quartz glass were measured. The results are shown in tables 3 and 4, and FIGS. 1 and 2. FIGS. 1 and 2 are graphs showing measurement results of transmittance before UV irradiation, and the results obtained after UV irradiation for 1000 hours were the same as those obtained before UV irradiation.

As shown in table 3, the 300 nm transmittance was 92.2%, and the titanium was considered tetravalent. When a shift amount of the transmittance of the glass at 800° C. was measured, the 50% transmittance wavelength of glass having a thickness of 2 mm was approximately 290 nm. Light from the low-pressure mercury lamp having an irradiation energy of 30 mW/cm$^2$ was irradiated for 1000 hours, but no absorption due to coloring could be seen in the visible region. Furthermore, when strain was confirmed by the sensitive color method, no strain was observed.

Furthermore, it could be confirmed that the glass contained no air bubbles or foreign matter inclusions having a diameter of equal to or greater than 0.1 mm and less than 0.5 mm, a diameter of between 0.5 mm and 1 mm, or a diameter in excess of 1 mm.

Exemplary Embodiment 3

Titanium-containing quartz glass was obtained by means of the same method as in Exemplary Embodiment 1 except for the following steps, as shown in table 2.

<Step b> The porous quartz glass parent material obtained by means of step a was subjected to a heating treatment for 100 hours under a reduced-pressure atmosphere of 0.1 MPa or less at 1300° C. to adjust the OH groups contained in the porous quartz glass parent material.

<Step c> The porous quartz glass parent material obtained after the step b was introduced into a hermetically sealed vessel, and the atmosphere was substituted with nitrogen gas, after which the temperature inside the oven was held at 500° C. and heating was performed for 10 hours for the purpose of soaking the parent material through to the interior thereof. The pressure was then reduced to 0.1 MPa or less using a vacuum pump, and the material was held and sealed off, after which titanium tetrachloride (TiCl$_4$) was introduced into the oven in a liquid state in an amount of 2% of the weight of the porous quartz glass parent material, and vaporized inside the oven, the pressure inside the vessel was stabilized then returned to atmospheric pressure using nitrogen gas, the gas was absorbed by the parent material, and the materials were held for 10 hours at 500° C.

<Step d> The porous quartz glass parent material obtained via the step c was subjected to a treatment for 20 hours under a nitrogen mixed atmosphere comprising 20% oxygen at 1300° C., and an oxidation treatment was performed using oxygen and the OH groups contained in the parent material, a dechlorination and dehydrochlorination treatment was performed, and a treatment to control the ionic valence of the titanium to tetravalent was performed.

<Step e> The porous quartz glass parent material obtained via the step d was held for 50 hours at 1500° C. under a reduced-pressure atmosphere of 1 Pa or less, and a transparent vitrification treatment was performed to obtain a quartz glass body.

Values of the physical properties of the resulting quartz glass were measured. The results are shown in tables 3 and 4, and FIGS. 1 and 2. FIGS. 1 and 2 are graphs showing measurement results of transmittance before UV irradiation, and the results obtained after UV irradiation for 1000 hours were the same as those obtained before UV irradiation.

As shown in table 3, the 300 nm transmittance was 92.2%, and the titanium was considered tetravalent. When a shift amount of the transmittance of the glass at 800° C. was measured, the 50% transmittance wavelength of glass having a thickness of 2 mm was approximately 290 nm. It was clear that emission lines of 300 nm or less could be sufficiently blocked during illumination, even when the quartz glass was used in a light source employing emission lines of 300 nm or greater, such as a high-pressure mercury lamp which reaches a high temperature, for example. Light from a low-pressure mercury lamp having an irradiation energy of 30 mW/cm$^2$ was irradiated for 1000 hours, but no absorption due to coloring could be seen in the visible region. Furthermore, when strain was confirmed by the sensitive color method, no strain was observed.

Furthermore, it could be confirmed that the glass contained no air bubbles or foreign matter inclusions having a diameter of equal to or greater than 0.1 mm and less than 0.5 mm, a diameter of between 0.5 mm and 1 mm, or a diameter in excess of 1 mm.

Exemplary Embodiment 4

Titanium-containing quartz glass was obtained by means of the same method as in Exemplary Embodiment 1 except for the following steps, as shown in table 2.

<Step b> The porous quartz glass parent material obtained by means of step a was subjected to a heating treatment for 20 hours under a nitrogen gas atmosphere at 1000° C. to adjust the OH groups contained in the porous quartz glass parent material.

<Step c> The porous quartz glass parent material obtained after the step b was introduced into a hermetically sealed vessel, and the atmosphere was substituted with nitrogen gas, after which the temperature inside the oven was held at 200° C. and heating was performed for 10 hours for the purpose of soaking the parent material through to the interior thereof. The pressure was then reduced to 0.1 MPa or less using a vacuum pump, and the material was held and sealed off, after which titanium tetrachloride (TiCl$_4$) was introduced into the oven in a liquid state in an amount of 0.2% of the weight of the porous quartz glass parent material, and vaporized inside the oven, the pressure inside the vessel was stabilized then returned to atmospheric pressure using nitrogen gas, and the materials were held for 10 hours at 200° C.

<Step d> The porous quartz glass parent material obtained via the step c was subjected to a treatment for 20 hours under a nitrogen mixed atmosphere comprising 20% oxygen at 400° C., and an oxidation treatment was performed using oxygen and the OH groups contained in the parent material, a dechlorination and dehydrochlorination treatment was performed, and a treatment to control the ionic valence of the titanium to tetravalent was performed.

<Step e> The porous quartz glass parent material obtained via the step d was held for 30 hours at 1500° C. under a reduced-pressure atmosphere of 1 Pa or less, and a transparent vitrification treatment was performed to obtain a quartz glass body.

Values of the physical properties of the resulting quartz glass were measured. The results are shown in tables 3 and 4, and FIGS. 1 and 2. FIGS. 1 and 2 are graphs showing measurement results of transmittance before UV irradiation, and the results obtained after UV irradiation for 1000 hours were the same as those obtained before UV irradiation.

As shown in table 3, the 300 nm transmittance was 92.4%, and the titanium was considered tetravalent. Light from a low-pressure mercury lamp having an irradiation energy of 30 mW/cm² was irradiated for 1000 hours, but no absorption due to coloring could be seen in the visible region. Furthermore, when strain was confirmed by the sensitive color method, no strain was observed.

Furthermore, it could be confirmed that the glass contained no air bubbles or foreign matter inclusions having a diameter of equal to or greater than 0.1 mm and less than 0.5 mm, a diameter of between 0.5 mm and 1 mm, or a diameter in excess of 1 mm.

Exemplary Embodiment 5

Titanium-containing quartz glass was obtained by means of the same method as in Exemplary Embodiment 1 except for the following steps, as shown in table 2.
<Step b> The porous quartz glass parent material obtained by means of step a was subjected to a heating treatment for 100 hours under a reduced-pressure atmosphere of <0.1 MPa at 1300° C. to adjust the OH groups contained in the porous quartz glass parent material.
<Step c> The porous quartz glass parent material obtained after the step b was introduced into a hermetically sealed vessel, and the atmosphere was substituted with nitrogen gas, after which the temperature inside the oven was held at 150° C. and heating was performed for 10 hours for the purpose of soaking the parent material through to the interior thereof. The pressure was then reduced to 0.1 MPa or less using a vacuum pump, and the material was held and sealed off, after which titanium tetrachloride (TiCl₄) was introduced into the oven in a liquid state in an amount of 0.1% of the weight of the porous quartz glass parent material, and vaporized inside the oven, the pressure inside the vessel was stabilized then returned to atmospheric pressure using nitrogen gas, and the materials were held for 10 hours at 150° C.
<Step d> The porous quartz glass parent material obtained via the step c was subjected to a treatment for 10 hours under an oxygen atmosphere at 150° C., and an oxidation treatment was performed using oxygen and the OH groups contained in the parent material, a dechlorination and dehydrochlorination treatment was performed, and a treatment to control the ionic valence of the titanium to tetravalent was performed.
<Step e> The porous quartz glass parent material obtained via the step d was held for 50 hours at 1500° C. under a reduced-pressure atmosphere of 1 Pa or less, and a transparent vitrification treatment was performed to obtain a quartz glass body.

Values of the physical properties of the resulting quartz glass were measured. The results are shown in tables 3 and 4, and FIGS. 1 and 2. FIGS. 1 and 2 are graphs showing measurement results of transmittance before UV irradiation, and the results obtained after UV irradiation for 1000 hours were the same as those obtained before UV irradiation.

As shown in table 3, the 300 nm transmittance was 92.4%, and the titanium was considered tetravalent. Light from a low-pressure mercury lamp having an irradiation energy of 30 mW/cm² was irradiated for 1000 hours, but no absorption due to coloring could be seen in the visible region. Furthermore, when strain was confirmed by the sensitive color method, no strain was observed. Furthermore, the 185 nm transmittance was <1%, and it was possible to block the light of 185 nm which it is desirable to block in a low-pressure mercury lamp.

Furthermore, it could be confirmed that the glass contained no air bubbles or foreign matter inclusions having a diameter of equal to or greater than 0.1 mm and less than 0.5 mm, a diameter of between 0.5 mm and 1 mm, or a diameter in excess of 1 mm.

Exemplary Embodiment 6

Titanium-containing quartz glass was obtained by means of the same method as in Exemplary Embodiment 1 except for the following steps, as shown in table 2.
<Step c> The porous quartz glass parent material obtained after the step b was introduced into a hermetically sealed vessel, and the atmosphere was substituted with nitrogen gas, after which the temperature inside the oven was held at 200° C. and heating was performed for 10 hours for the purpose of soaking the parent material through to the interior thereof. The pressure was then reduced to 0.1 MPa or less using a vacuum pump, and the material was held and sealed off, after which titanium tetrachloride (TiCl₄) was introduced into the oven in a liquid state in an amount of 0.1% of the weight of the porous quartz glass parent material, and vaporized inside the oven, the pressure inside the vessel was stabilized then returned to atmospheric pressure using nitrogen gas, and the materials were held for 10 hours at 200° C.
<Step d> The porous quartz glass parent material obtained via the step c was subjected to a treatment for 10 hours under an oxygen atmosphere at 150° C., and an oxidation treatment was performed using oxygen and the OH groups contained in the parent material, a dechlorination and dehydrochlorination treatment was performed, and a treatment to control the ionic valence of the titanium to tetravalent was performed.

Values of the physical properties of the resulting quartz glass were measured. The results are shown in tables 3 and 4, and FIGS. 1 and 2. FIGS. 1 and 2 are graphs showing measurement results of transmittance before UV irradiation, and the results obtained after UV irradiation for 1000 hours were the same as those obtained before UV irradiation.

As shown in table 3, the 300 nm transmittance was 92.4%, and the titanium was considered tetravalent. Light from a low-pressure mercury lamp having an irradiation energy of 30 mW/cm² was irradiated for 1000 hours, but no absorption due to coloring could be seen in the visible region. Furthermore, when strain was confirmed by the sensitive color method, no strain was observed. Furthermore, the 185 nm transmittance was 1% or less, and it was possible to block the light of 185 nm which it is desirable to block in a low-pressure mercury lamp.

Furthermore, the glass contained two air bubbles or foreign matter inclusions having a diameter of equal to or greater than 0.1 mm and less than 0.5 mm per 100 g, one air bubble or foreign matter inclusion having a diameter of between 0.5 mm and 1 mm per 100 g, and no air bubbles or foreign matter inclusions having a diameter in excess of 1 mm could be observed.

Exemplary Embodiment 7

Titanium-containing quartz glass was obtained by means of the same method as in Exemplary Embodiment 1 except for the following step, as shown in table 2.

<Step c> The porous quartz glass parent material obtained after the step b was introduced into a hermetically sealed vessel, and the atmosphere was substituted with nitrogen gas, after which the temperature inside the oven was held at 300° C. and heating was performed for 10 hours for the purpose of soaking the parent material through to the interior thereof. The pressure was then reduced to <0.1 MPa using a vacuum pump, and the material was held and sealed off, after which tetraisopropyl orthotitanate ($C_{12}H_{28}O_4Ti$) was introduced into the oven in a liquid state in an amount of 1.6% of the weight of the porous quartz glass parent material, and vaporized inside the oven, and the materials were held for 10 hours at 300° C.

Values of the physical properties of the resulting quartz glass were measured. The results are shown in tables 3 and 4, and FIGS. 1 and 2. FIGS. 1 and 2 are graphs showing measurement results of transmittance before UV irradiation, and the results obtained after UV irradiation for 1000 hours were the same as those obtained before UV irradiation.

As shown in table 3, the 300 nm transmittance was 92.4%, and the titanium was considered tetravalent. Light from a low-pressure mercury lamp having an irradiation energy of 30 mW/cm$^2$ was irradiated for 1000 hours, but no absorption due to coloring could be seen in the visible region. Furthermore, when strain was confirmed by the sensitive color method, no strain was observed. Furthermore, the 185 nm transmittance was 1% or less, and it was possible to block the light of 185 nm which it is desirable to block in a low-pressure mercury lamp.

Furthermore, it could be confirmed that the glass contained no air bubbles or foreign matter inclusions having a diameter of equal to or greater than 0.1 mm and less than 0.5 mm, a diameter of between 0.5 mm and 1 mm, or a diameter in excess of 1 mm.

Comparative Example 1

Titanium-containing quartz glass was obtained by means of the same method as in Exemplary Embodiment 1 except for the following step, as shown in table 5.

<Step d> The porous quartz glass parent material doped with titanium tetrachloride ($TiCl_4$) obtained after the step c was subjected to a heat treatment for 10 hours under a nitrogen atmosphere at 400° C.

TABLE 5

| | Step a | Step b | | | Step c | | | |
|---|---|---|---|---|---|---|---|---|
| | Parent-material | Temp. (° C.) | Atm. | Time (h) | Temp. (° C.) | Atm. | Amount of dopant (weight ratio parent material) | Time (h) |
| Comparative Example 1 | CVD | 100 | N$_2$ 100% | 20 | 300 | only TiCl$_4$ | 1% | 10 |
| Comparative Example 2 | CVD | 1300 | <0.1 MPa | 100 | 300 | only TiCl$_4$ | 1% | 10 |
| Comparative Example 3 | Produced by melting a mixture of titanium dioxide powder and powder of natural crystal in the oxyhydrogen flame | | | | | | | |
| Comparative Example 4 | CVD | 100 | N$_2$ 100% | 20 | 1000 | only TiCl$_4$ | 1% | 10 |
| Comparative Example 5 | CVD | 1300 | <0.1 MPa | 100 | 50 | only TiCl$_4$ | 0.1% | 10 |
| Comparative Example 6 | CVD | 100 | N$_2$ 100% | 20 | 200 | TiCl$_4$ + N$_2$ | 2.2% | 10 |
| Comparative Example 7 | CVD | 100 | N$_2$ 100% | 20 | 50 | only TiCl$_4$ | 0.1% | 10 |
| Experimental Example | CVD | 100 | N$_2$ 100% | 20 | 300 | TiCl$_4$ + N$_2$ | Mixed flow concentration ratio: 2% | 10 |

| | Step d | | | Step e | | |
|---|---|---|---|---|---|---|
| | Temp. (° C.) | Atm. | Time (h) | Temp. (° C.) | Atm. | Time (h) |
| Comparative Example 1 | 400 | N$_2$ 100% | 10 | 1600 | <0.1 MPa | 5 |
| Comparative Example 2 | 1000 | O$_2$ 100% | 10 | 1300→1500 | <1 Pa | 100→30 |
| Comparative Example 3 | Produced by melting a mixture of titanium dioxide powder and powder of natural crystal in the oxyhydrogen flame | | | | | |
| Comparative Example 4 | 400 | O$_2$ 100% | 10 | 1600 | <0.1 MPa | 5 |
| Comparative Example 5 | 1300 | O$_2$ 100% | 10 | 1300→1500 | <1 Pa | 100→30 |
| Comparative Example 6 | 400 | O$_2$ 100% | 10 | 1600 | N$_2$ 100% | 5 |
| Comparative Example 7 | 400 | O$_2$ 100% | 10 | 1600 | N$_2$ 100% | 5 |
| Experimental Example | 400 | O$_2$ 100% | 10 | 1600 | <0.1 MPa | 5 |

Values of the physical properties of the resulting quartz glass were measured. The results are shown in tables 6 and 7, and FIG. 3. FIG. 3 is a graph showing measurement results of transmittance before UV irradiation.

TABLE 6

| | Titanium concentration (ppm) | | OH group concentration (ppm) | | Chlorine concentration | Number of bubbles/foreign matter inclusions (per 100 g) | | | Before UV radiation Color |
|---|---|---|---|---|---|---|---|---|---|
| | Average | Measured | Max. Value | Min. Value | | 0.1~0.5 mm | 0.5~1 mm | >1 mm | |
| Comparative Example 1 | 120 | 100-130 | 350 | 210 | Not detected | 0 | 0 | 0 | pale black |
| Comparative Example 2 | 120 | 90-140 | 5 | 1 | Not detected | 0 | 0 | 0 | Colorless |
| Comparative Example 3 | 100 | 90-120 | 180 | 150 | Not detected | 4 | 3 | 2 | Colorless |
| Comparative Example 4 | 100 | 80-110 | 200 | 150 | 200 | 0 | 0 | 0 | Colorless |
| Comparative Example 5 | 5 | 2-8 | 7 | 1 | Not detected | 0 | 0 | 0 | Colorless |
| Comparative Example 6 | 600 | 580-630 | 450 | 370 | Not detected | 2 | 1 | 0 | Colorless |
| Comparative Example 7 | 7 | 5-10 | 400 | 355 | Not detected | 1 | 0 | 0 | Colorless |
| Experimental Example. | 20-100 | 5-110 | 350 | 200 | Not detected | 0 | 0 | 0 | Colorless |

| | Before UV radiation | | | | | After 1000 h UV radiation | |
|---|---|---|---|---|---|---|---|
| | 300 nm transmittance (%) | 185 nm transmittance (%) | 50% transmittance wavelength (nm) 25° C. | 50% transmittance wavelength (nm) 800° C. | Color | 300 nm transmittance (%) | Strain (nm/cm) |
| Comparative Example 1 | 90.8 | <1 | 241 | 270 | — | | |
| Comparative Example 2 | 92.3 | <1 | 240 | 270 | Crack damage | | |
| Comparative Example 3 | 92.1 | <1 | 238 | 266 | Brown | 92.2 | Not detected |
| Comparative Example 4 | 92.3 | <1 | 237 | 266 | Colorless | 92.4 | Not detected |
| Comparative Example 5 | 92.4 | 20 | 215 | 226 | Crack damage | | |
| Comparative Example 6 | 92.2 | <1 | 251 | 302 | Colorless | 92.2 | 15 |
| Comparative Example 7 | 92.4 | 12 | 218 | 231 | Colorless | 92.4 | 10 |
| Experimental Example. | — | — | — | — | — | — | — |

TABLE 7

| Purity | Element concentration (ppb) | | | | | | | | | | | | Total (PPb) |
|---|---|---|---|---|---|---|---|---|---|---|---|---|---|
| | Al | Li | Na | K | Ca | Mg | Fe | Ni | Cu | Cr | Mo | V | |
| Comparative Example 1 | 3 | 1 | 1 | Not detected | Not detected | Not detected | Not detected | Not detected | 1 | 1 | Not detected | Not detected | 7 |
| Comparative Example 2 | Not detected | Not detected | 4 | 3 | 30 | <1 | 23 | 1 | Not detected | 15 | Not detected | Not detected | 76 |
| Comparative Example 3 | 15000 | 300 | 200 | 200 | 300 | 80 | 100 | 60 | 60 | 65 | 70 | 60 | 16495 |
| Comparative Example 4 | Not detected | 1 | 1 | 1 | Not detected | Not detected | Not detected | Not detected | Not detected | Not detected | Not detected | Not detected | 3 |
| Comparative Example 5 | 6 | 1 | 1 | Not detected | Not detected | Not detected | Not detected | Not detected | 1 | 1 | Not detected | Not detected | 10 |

TABLE 7-continued

| Purity | Element concentration (ppb) | | | | | | | | | | | | Total |
|---|---|---|---|---|---|---|---|---|---|---|---|---|---|
| | Al | Li | Na | K | Ca | Mg | Fe | Ni | Cu | Cr | Mo | V | (PPb) |
| Comparative Example 6 | Not detected | 1 | 3 | 2 | 25 | Not detected | 20 | 1 | Not detected | 14 | Not detected | Not detected | 66 |
| Comparative Example 7 | Not detected | 1 | 1 | Not detected | Not detected | Not detected | Not detected | Not detected | 1 | 1 | Not detected | Not detected | 4 |
| Experimental Example | Not detected | 1 | 1 | Not detected | Not detected | Not detected | Not detected | Not detected | Not detected | Not detected | Not detected | Not detected | 2 |

Detection limit of OH groups: 0.1 ppm;
Detection limit of chlorine concentration: 30 ppm
Detection limit of strain: 5 nm/cm
Detection limit for each element: 1 ppb As shown in tables 6 and 7, physical properties the same as those of Exemplary Embodiment 1 were obtained for the element concentrations, but because the heating treatment was performed in a nitrogen atmosphere, which is a reducing atmosphere, instead of the heating treatment under an oxygen atmosphere in the step d, there was absorption in a wavelength region longer than 300 nm, a pale black coloring was confirmed, the 300 nm transmittance was 90.8%, and the titanium was considered trivalent. Irradiation of light from a low-pressure mercury lamp having an irradiation energy of 30 mW/cm² was therefore not performed.
Furthermore, it could be confirmed that the glass contained no air bubbles or foreign matter inclusions having a diameter of equal to or greater than 0.1 mm and less than 0.5 mm, a diameter of between 0.5 mm and 1 mm, or a diameter in excess of 1 mm.

Comparative Example 2

Titanium-containing quartz glass having an OH group concentration of less than 10 ppm was obtained by means of the same method as in Exemplary Embodiment 1 except for the following steps, as shown in table 5.
<Step b> The porous quartz glass parent material obtained in the step a was subjected to a heating treatment for 100 hours under a reduced-pressure atmosphere of <0.1 MPa at 1300° C. to adjust the OH groups contained in the porous quartz glass parent material.
<Step d> The porous quartz glass parent material obtained via the step c was subjected to a heating treatment for 10 hours under an oxygen atmosphere at 1000° C., and an oxidation treatment was performed using oxygen and the OH groups contained in the parent material, a chloride ion removal treatment was performed, and a treatment to control the ionic valence of the titanium to tetravalent was performed.
<Step e> In order to remove the OH groups, the porous quartz glass parent material obtained via the step d was further held for 100 hours under a reduced-pressure atmosphere of <1 Pa at 1300° C., at which transparent vitrification of the surface of the parent material does not progress, after which the parent material was held for 30 hours under a reduced-pressure atmosphere of <1 Pa at 1500° C. to perform a transparent vitrification treatment, and a quartz glass body was obtained.
Values of the physical properties of the resulting quartz glass were measured. The results are shown in tables 6 and 7. As shown in table 6, the OH group concentration of the quartz glass body was a maximum of 5 ppm. Light from the low-pressure mercury lamp having an irradiation energy of 30 mW/cm² was irradiated, but multiple cracks caused damage to the sample surface at 300 hours of irradiation.
Furthermore, it could be confirmed that the glass contained no air bubbles or foreign matter inclusions having a diameter of equal to or greater than 0.1 mm and less than 0.5 mm, a diameter of between 0.5 mm and 1 mm, or a diameter in excess of 1 mm.

Comparative Example 3

Figure 4:
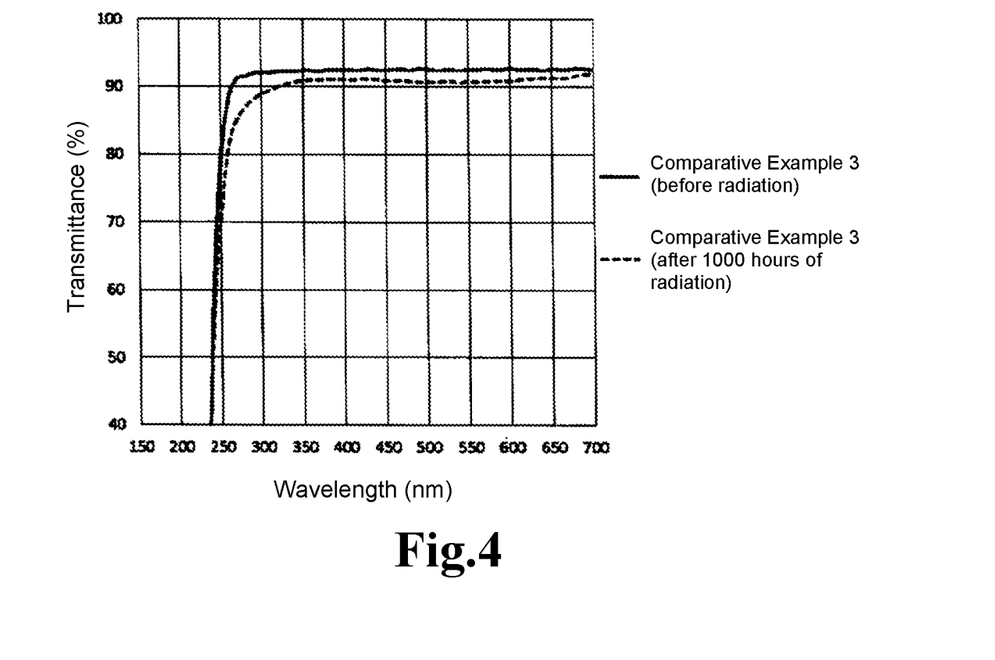
FIG. 4 is a graph showing measurement results of transmittance before and after UV irradiation in Comparative Example 3.

Titanium dioxide equivalent to a Ti concentration of 100 ppm was mixed with a natural crystal powder, vitrification was performed by oxyhydrogen flame melting, and a quartz glass body was obtained.
Values of the physical properties of the resulting quartz glass body were measured. The results are shown in tables 6 and 7, and FIG. 4. In table 7, the minimum values and total of concentrations of each of the elements Al, Li, Na, K, Ca, Mg, Fe, Ni, Cu, Cr, Mo and V are shown for Comparative Example 3 only. FIG. 4 is a graph showing measurement results of transmittance before UV irradiation.
As shown in table 7, the purity of the quartz glass body was such that the concentration of each of the elements Al, Li, Na, K, Ca, Mg, Fe, Ni, Cu, Cr, Mo and V exceeded 50 ppb. As shown in table 6 and FIG. 4, when light from a low-pressure mercury lamp having an irradiation energy of 30 mW/cm2 was irradiated for 1000 hours, a brown coloring was confirmed, and the transmittance also showed absorption up to the region of 700 nm, with the 300 nm transmittance being 88.9%. When strain was confirmed by the sensitive color method, no strain was observed.
However, the glass contained four air bubbles or foreign matter inclusions having a diameter of equal to or greater than 0.1 mm and less than 0.5 mm per 100 g, and three air bubbles or foreign matter inclusions having a diameter of between 0.5 mm and 1 mm per 100 g. There were two air bubbles or foreign matter inclusions having a diameter in excess of 1 mm.

Comparative Example 4

Titanium-containing quartz glass having a chlorine concentration of 30 ppm or greater was obtained by means of the same method as in Exemplary Embodiment 1 except for the following step, as shown in table 5.
<Step c> The porous quartz glass parent material obtained after the step b was introduced into a hermetically sealed vessel, and the atmosphere was substituted with nitrogen gas, after which the temperature inside the oven was held at 1000° C. and heating was performed for 10 hours for the purpose of soaking the parent material through to the interior thereof. The pressure was then reduced to 0.1 MPa or less using a vacuum pump, and the material was held and sealed off, after which titanium tetrachloride (TiCl₄) was introduced into the oven in a liquid state in an amount of 1% of the weight of the porous quartz glass parent material, and vaporized inside the oven, and the materials were held for 10 hours at 1000° C.

Values of the physical properties of the resulting quartz glass were measured. The results are shown in tables 6 and 7.

As shown in table 6, the chlorine concentration of the quartz glass was a maximum of 200 ppm. When light from a low-pressure mercury lamp having an irradiation energy of 30 mW/cm2 was irradiated for 1000 hours, no absorption due to coloring could be seen in the visible region, but absorption of the oxygen defect type was apparent in the region of 200-300 nm, and there was also a reduction in the transmittance overall because of other structural defects, with the 300 nm transmittance being 80.4%. When strain was confirmed by the sensitive color method, no strain was observed.

Furthermore, it could be confirmed that the glass contained no air bubbles or foreign matter inclusions having a diameter of equal to or greater than 0.1 mm and less than 0.5 mm, a diameter of between 0.5 mm and 1 mm, or a diameter in excess of 1 mm.

Comparative Example 5

Titanium-containing quartz glass having an average concentration of titanium of less than 10 ppm and an OH group concentration of less than 10 ppm was obtained by means of the same method as in Exemplary Embodiment 1 except for the following steps, as shown in table 5.
  <Step b> The porous quartz glass parent material obtained in the step a was subjected to a heating treatment for 100 hours under a reduced-pressure atmosphere of 0.1 MPa or less at 1300° C. to adjust the OH groups contained in the porous quartz glass parent material.
  <Step c> The porous quartz glass parent material obtained after the step b was introduced into a hermetically sealed vessel, and the atmosphere was substituted with nitrogen gas, after which the temperature inside the oven was held at 50° C. and heating was performed for 10 hours for the purpose of soaking the parent material through to the interior thereof. The pressure was then reduced to 0.1 MPa or less using a vacuum pump, and the material was held and sealed off, after which titanium tetrachloride (TiCl$_4$) was introduced into the oven in a liquid state in an amount of 0.1% of the weight of the porous quartz glass parent material, and the materials were held for 10 hours at 50° C.
  <Step d> The porous quartz glass parent material obtained via the step c was subjected to a treatment for 10 hours under an oxygen atmosphere at 1300° C., and an oxidation treatment was performed using oxygen and the OH groups contained in the parent material, a chloride ion removal treatment was performed, and a treatment to control the ionic valence of the titanium to tetravalent was performed.
  <Step e> In order to remove the OH groups, the porous quartz glass parent material obtained via the step d was further held for 100 hours under a reduced-pressure atmosphere of 1 Pa or less at 1300° C., at which transparent vitrification of the surface of the parent material does not progress, after which the parent material was held for 30 hours under a reduced-pressure atmosphere of 1 Pa or less at 1500° C. to perform a transparent vitrification treatment, and a quartz glass body was obtained.

Figure 5:
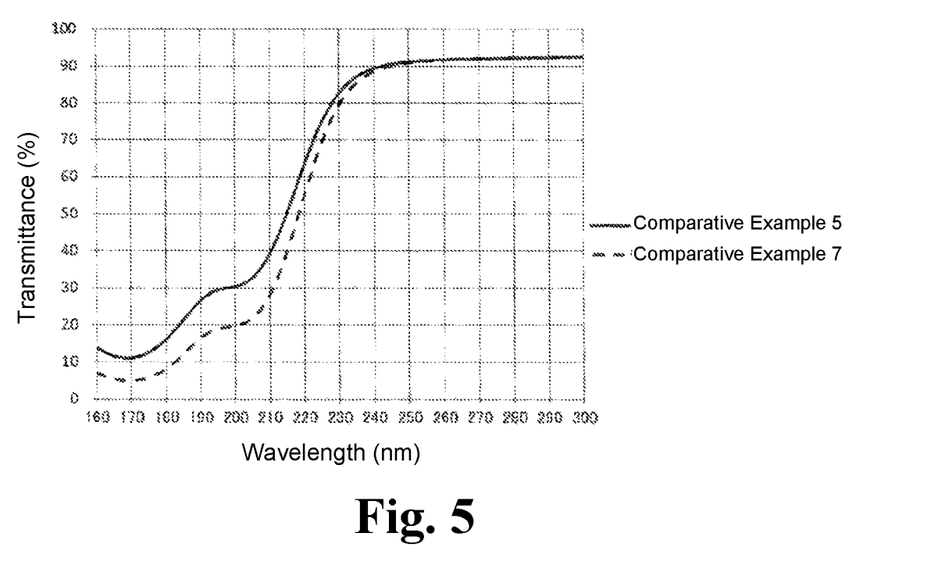
FIG. 5 is a graph showing measurement results of transmittance before UV irradiation in Comparative Examples 5 and 7.

Values of the physical properties of the resulting quartz glass were measured. The results are shown in tables 6 and 7, and FIG. 5. FIG. 5 is a graph showing measurement results of transmittance before UV irradiation.

As shown in table 6, the average concentration of titanium of the quartz glass was 5 ppm, and the OH group concentration was a maximum of 7 ppm. As shown in FIG. 5, the 185 nm transmittance was approximately 20%, and it was virtually impossible to block light of 185 nm from a low-pressure mercury lamp. Light from the low-pressure mercury lamp having an irradiation energy of 30 mW/cm2 was irradiated for 1000 hours, but multiple cracks caused damage to the sample surface at 500 hours of irradiation.

Furthermore, it could be confirmed that the glass contained no air bubbles or foreign matter inclusions having a diameter of equal to or greater than 0.1 mm and less than 0.5 mm, a diameter of between 0.5 mm and 1 mm, or a diameter in excess of 1 mm.

Comparative Example 6

Titanium-containing quartz glass having an average concentration of titanium of greater than 500 ppm and an OH group concentration of greater than 350 ppm was obtained by means of the same method as in Exemplary Embodiment 1 except for the following steps, as shown in table 5.
  <Step c> The porous quartz glass parent material obtained after the step b was introduced into a hermetically sealed vessel, and the atmosphere was substituted with nitrogen gas, after which the temperature inside the oven was held at 200° C. and heating was performed for 10 hours for the purpose of soaking the parent material through to the interior thereof. The pressure was then reduced to 0.1 MPa or less using a vacuum pump, and the material was held and sealed off, after which titanium tetrachloride (TiCl$_4$) was introduced into the oven in a liquid state in an amount of 2.2% of the weight of the porous quartz glass parent material, and the materials were held for 10 hours at 200° C.
  <Step e> The porous quartz glass parent material obtained via the step d was held for 5 hours under atmospheric pressure in a nitrogen atmosphere at 1600° C. to perform a transparent vitrification treatment, and a quartz glass body was obtained.

Values of the physical properties of the resulting quartz glass were measured. The results are shown in tables 6 and 7.

As shown in table 6, the average concentration of titanium in the quartz glass was 600 ppm and the OH group concentration was a maximum of 450 ppm.

When the shift amount of the transmittance of the glass at 800° C. was measured, the 50% transmittance wavelength of glass having a thickness of 2 mm was approximately 300 nm. Since absorbance is proportional to the length over which light is transmitted, the absorption of the glass itself increases when the thickness increases, and there is a further shift to the long wavelength side, and it was therefore clear that such quartz glass cannot be used in applications to a light source of a high-pressure mercury lamp which reaches a very high temperature and uses emission lines of 300 nm or greater.

No absorption due to coloring could be seen in the visible region as a result of light from a low-pressure mercury lamp having an irradiation energy of 30 mW/cm2 being irradiated for 1000 hours, but when strain was confirmed by the sensitive color method, strain of 15 nm/cm, which was not seen in the exemplary embodiments, was observed.

Furthermore, the glass contained two air bubbles or foreign matter inclusions having a diameter of equal to or greater than 0.1 mm and less than 0.5 mm per 100 g, one air bubble or foreign matter inclusion having a diameter of between 0.5 mm and 1 mm per 100 g, and 0 air bubbles or foreign matter inclusions having a diameter in excess of 1 mm.

Comparative Example 7

Titanium-containing quartz glass having an average concentration of titanium of less than 10 ppm and an OH group concentration of greater than 350 ppm was obtained by means of the same method as in Exemplary Embodiment 1 except for the following steps, as shown in table 5.
<Step c> The porous quartz glass parent material obtained after the step b was introduced into a hermetically sealed vessel, and the atmosphere was substituted with nitrogen gas, after which the temperature inside the oven was held at 50° C. and heating was performed for 10 hours for the purpose of soaking the parent material through to the interior thereof. The pressure was then reduced to 0.1 MPa or less using a vacuum pump, and the material was held and sealed off, after which titanium tetrachloride (TiCl$_4$) was introduced into the oven in a liquid state in an amount of 0.1% of the weight of the porous quartz glass parent material, and the materials were held for 10 hours at 50° C.
<Step e> The porous quartz glass parent material obtained via the step d was held for 5 hours under atmospheric pressure in a nitrogen atmosphere at 1600° C. to perform a transparent vitrification treatment, and a quartz glass body was obtained.

Values of the physical properties of the resulting quartz glass were measured. The results are shown in tables 6 and 7, and FIG. 5.

As shown in table 6, the average concentration of titanium in the quartz glass was 7 ppm and the OH group concentration was a maximum of 400 ppm. As shown in FIG. 5, the 185 nm transmittance was approximately 12%, and it was completely impossible to block light of 185 nm from a low-pressure mercury lamp.

No absorption due to coloring could be seen in the visible region as a result of light from a low-pressure mercury lamp having an irradiation energy of 30 mW/cm2 being irradiated for 1000 hours, but when strain was confirmed by the sensitive color method, strain of 10 nm/cm, which was not seen in the exemplary embodiments, was observed.

Furthermore, the glass contained 0 air bubbles or foreign matter inclusions having a diameter of equal to or greater than 0.1 mm and less than 0.5 mm per 100 g, one air bubble or foreign matter inclusion having a diameter of between 0.5 mm and 1 mm per 100 g, and 0 air bubbles or foreign matter inclusions having a diameter in excess of 1 mm.

Experimental Example 1

Titanium-containing quartz glass was obtained by means of the same method as in Exemplary Embodiment 1 except for the following step, as shown in table 5.
<Step c> The porous quartz glass parent material obtained after the step b was introduced into a hermetically sealed vessel, nitrogen gas was introduced through a pipe from a lower portion of the vessel, the temperature inside the oven was held at 300° C. while the nitrogen gas was made to flow in such a way as to be bled from an upper pipe, and heating was performed for 10 hours for the purpose of soaking the parent material through to the interior thereof. After this, the nitrogen gas was substituted with a mixed gas comprising titanium tetrachloride (TiCl$_4$) and nitrogen gas in a concentration ratio of 2%, and the material was held for 10 hours at 1000° C. while this mixed gas was likewise made to flow from the bottom to the top of the vessel. The amount of titanium tetrachloride used needed to be approximately three times that of Exemplary Embodiment 1 for the same titanium concentration.

Values of the physical properties of the resulting quartz glass were measured. The results are shown in tables 6 and 7. In Experimental Example 1, the average of the titanium concentration in a radial direction showed a difference in a vertical direction (longitudinal direction), so the average value of the titanium concentration in table 6 shows the minimum value-maximum value of the average value in the radial direction at each position, and the measured value denotes the minimum value-maximum value at all measurement points. As shown in table 6, the average value in the radial direction at the lower end of the vessel in the longitudinal direction was 100 ppm, and the average value at the upper end was 20 ppm, so a distribution was present in the titanium concentration. The transmittance was therefore not measured, and light was not irradiated from a low-pressure mercury lamp having an irradiation energy of 30 mW/cm2.

The invention claimed is:
1. A titanium-containing quartz glass having excellent UV absorption comprising:
an average concentration of titanium between 10 ppm by mass and 500 ppm by mass;
an OH group concentration in a range of between 10 ppm by mass and 350 ppm by mass;
wherein the concentration of each of the elements Al, Li, Na, K, Ca, Mg, Fe, Ni, Cu, Cr, Mo and V is 50 ppb or less by mass;
wherein the total concentration of the elements Al, Li, Na, K, Ca, Mg, Fe, Ni, Cu, Cr, Mo and V is 150 ppb or less by mass;
wherein a chlorine concentration is less than 30 ppm by mass; and
wherein the titanium-containing quartz glass is colorless.
2. The titanium-containing quartz glass as claimed in claim 1, wherein the titanium-containing quartz glass contains two or fewer air bubbles or foreign matter inclusions having a diameter of equal to or greater than 0.1 mm, and less than 0.5 mm per 100 g, no more than one air bubble or foreign matter inclusion having a diameter of between 0.5 mm and 1 mm per 100 g, and no air bubbles or foreign matter inclusions having a diameter in excess of 1 mm.
3. A method for producing the titanium-containing quartz glass as claimed in claim 1, said method comprising:
a titanium doping step in which a porous quartz glass parent material produced by chemical vapor deposition is introduced into a hermetically sealed vessel and held at a temperature of between 100° C. and 500° C. under a reduced-pressure atmosphere of 0.1 MPa or less, after which a titanium compound is introduced therein as a liquid or in a state of having already been gasified in a vaporizer, and the materials are held to perform doping in such a way that an average concentration of titanium in the resulting titanium-containing quartz glass is between 10 ppm by mass and 500 ppm by mass; and
a step in which the porous quartz glass parent material after the titanium doping step is subjected to a heating treatment under an oxygen-containing atmosphere, and then subjected to a transparent vitrification treatment to obtain a colorless titanium-containing quartz glass hav- ing an OH group concentration in a range of between 10 ppm by mass and 350 ppm by mass.

4. The method for producing titanium-containing quartz glass as claimed in claim 3, wherein the titanium compound is at least one selected from the group consisting of titanium chloride and an organic titanium compound.

\* \* \* \* \*